Feb. 16, 1943.    B. H. R. SANDELL    2,311,087
ELECTRICALLY HEATED STOVE AND THE LIKE
Filed Dec. 3, 1940
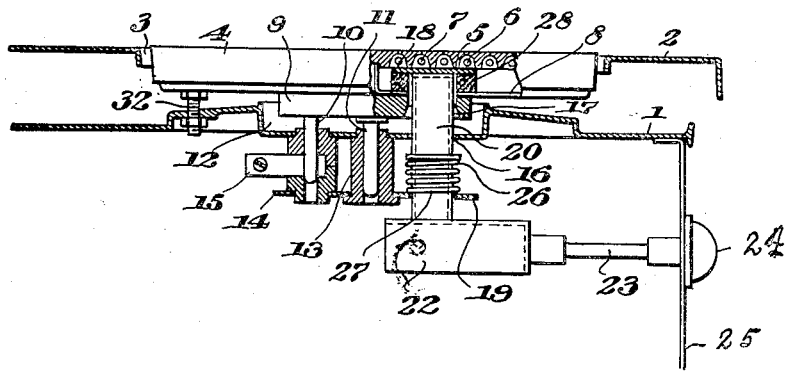
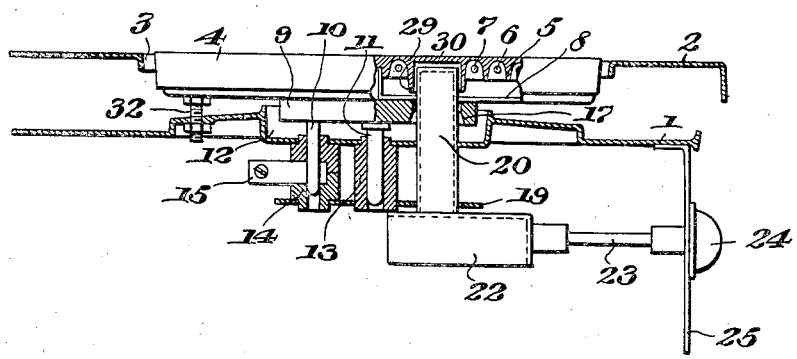
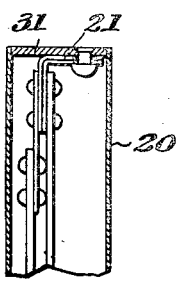
Inventor:
B. H. R. Sandell
By Young, Emery & Thompson
attys.

Patented Feb. 16, 1943

2,311,087

UNITED STATES PATENT OFFICE 2,311,087

ELECTRICALLY HEATED STOVE AND THE LIKE

Bror Hugo Ragnvald Sandell, Amal, Sweden

Application December 3, 1940, Serial No. 368,399
In Sweden May 13, 1939

1 Claim. (Cl. 219—37)

The present invention relates to improvements in electrically heated stoves and the like having detachably mounted heater plates.

In electrically heated stoves it has previously been usual for the control of the temperature of the heater plates to provide the resistance elements in said plates with centre taps and to provide a switch by means of which each resistance element may be connected to the source of current either with the said two portions in parallel (full heating effect) or so that only one of said portions is cut in (half heating effect) or finally so that the two portions are in series (one quarter of full heating effect).

An arrangement of this kind suffers from the drawback, however, that the temperature control is of a step-wise nature, and for practical reasons it is possible to provide for a very small number of steps only. Furthermore, it is difficult to unite the demand for a quick heating of the heater plate from the cold state (heating to boiling temperature) with the requirement that the smallest heating effect shall be just suitable for maintaining the temperature of the heated cooking-vessel (continued boiling). If the total heating effect (i. e. that obtained with the two portions of the resistance element connected in parallel) is increased for obtaining a quick rise of the temperature to the boiling point, then it cannot be avoided that also the smallest heating effect (i. e. that obtained with the two portions of the heating element connected in series) is too great for the continued boiling, and therefore it has been necessary to rest satisfied with a relatively limited total effect and a correspondingly increased period of time required for the heating of a cooking-vessel to boiling temperature.

This drawback is eliminated according to the present invention by employment of a thermostatic control member which is adjustable for different temperatures. This arrangement according to the invention is characterized by the feature that beneath each of the heater plates the stove carries a thermostatic control member adjustable for different temperatures and adapted to control the heating circuit of the plate, the heat susceptible portion of said control member being adapted to engage a recess in the underside of the heater plate, which recess extends adjacent to the resistance element mounted within the plate.

The invention is illustrated in the accompanying drawing in which:

Fig. 1 is a side view partly in section of a first embodiment, whereas

Fig. 2 is a similar side view of another embodiment and

Fig. 3 shows a detail in longitudinal section.

In Fig. 1, 1 is the lower top plate and 2 is the upper top plate of an electrically heated stove. The upper top plate is provided with circular apertures 3 for the electrically heated heater plates. The underside of each heater plate 4 is provided with a number of concentric ridges 5 forming grooves between them, in which the resistance element 6 is mounted in a countersunk position, the said resistance being embedded in a heat resistant insulation material 7. The underside of the heater plate 4 is closed by means of a detachable bottom plate 8, which may be secured by means of screws or the like.

The central portion of the said bottom plate 8 carries an insulating socket 9 provided with protruding contact pins 10 electrically connected to the ends of the heating resistance. The said socket is also provided with a central pin 11 for earth connection.

The lower top plate 1 is provided with a down-pressed portion 12 carrying a metallic sleeve 13 for the central pin 11 (connected to earth) and insulation sleeves 14 for the contact pins 10, such latter sleeves being provided with contact springs 15. The heater plate 4 is inserted into or taken out from the stove by insertion or removal, respectively, of the pins 10, 11 in the corresponding sleeves 13, 14.

Near the edge the bottom of the depressed portion 12 is provided with a hole 16, and a similar hole, or channel 17, is provided through the socket 9 and the bottom closing plate 8 of the heater plate, this lastmentioned channel extending adjacent to the resistance element 6. Opposite to the channel 17, the heater plate 4 is interiorly provided with a disc 18 made from a suitable heat resistant material, preferably mica, and this disc may rest directly against the ridges 5, as shown.

At their lower ends the sleeves 13, 14 support a sidewardly extending plate 19 provided with a hole in alignment with the hole 16 and the channel 17. A cylindrical hollow body 20 extends through the hole 16 and the channel 17, and this body has a flat upper end surface 31 perpendicular to the axis of the same. This body 20 contains a member which is susceptible to heat, for instance a bi-metallic strip 21 (Fig. 3), which is intended to be influenced by variations in temperature. The bi-metallic strip 21 is for instance angle-bent and one shank of the same is riveted to the inner side of the metallic end wall 31 of the cylindrical body 20, as shown in Fig. 3. The cylindrical body 20 is mounted on a box-shaped member 22 enclosing a switch construction adapted to be controlled by the bi-metallic member. One end of a shaft 23 extends into the box 22, and the other end of the same extends through the front panel 25 of the stove and is provided with a knob handle 24. The temperature at which the bi-metallic member actuates the switch is adapted to be controlled by means of said handle. The switch is included in the electric circuit through the resistance element 6 of the heater plate.

The cylindrical body 20 is also provided with a flange 26, and a helical expansion spring 27 is inserted between this flange and the plate 19. The aggregate comprising the box 22 and the cylindrical body 20 has a limited universal movability, and therefore the spring 27 will press the cylinder 20 upwardly so that the upper flat end wall of the same will abut against the flat disc 18, and in this manner a good heat conducting contact will be obtained between the interior of the heater plate and the thermostatic control member. When mounting the heater plate in or dismounting the same from the stove, or when exchanging heater plates, exactly the same good heat conducting contact will always be obtained since the presence of the spring in connection with the universal movability of the thermostatic controller will secure that the contact faces automatically tend to take the correct positions.

The construction is intended to be manipulated in such a manner that at first it is adjusted for maximal temperature by means of the handle 24 so that the cold heater plate 4 is rapidly heated sufficiently for starting the boiling in the pot placed thereon, and thereafter the temperature is controlled to a suitable lower value for continued boiling.

Naturally, there is no hindrance for shaping the contact faces at the upper end of the cylinder 20 and within the heater plate, respectively, in another manner, for instance conical or spherical, or the like. The separate disc 18 may also be dispensed with, and the upper end of the cylinder may abut directly against the insulation 7. A ring 28 of suitable material, for instance compressed glass wool, may preferably be inserted in the space between the plates 18 and 8 so that it surrounds the end of the cylinder 20 and prevents uncontrollable air flows within the heater plate.

Another embodiment of the invention is illustrated in Fig. 2, and the same references are used therein for corresponding parts of construction as in Fig. 1. According to Fig. 2, the box member 22 and the cylinder 20 containing the bi-metallic member are rigidly secured to the stove. Similarly as in Fig. 1, the heater plate 4 is provided with the channel means 17, and in the extension thereof the body of the heater plate containing the resistance element 6 is provided with a recess 30 surrounded by a flange boss 29, into which the upper end of the cylinder 20 extends. The said cylinder is so short that it does not contact with the bottom of the recess 30, but everywhere it is surrounded by a thin air space. Hence, the heat must be conveyed solely by radiation. Due to the fixed position of the cylinder 20 in relation to the channel 17 and the recess 30, and due to the fact that these constructional members surround the cylinder with a small clearance only, such conditions sufficiently independent of exterior influences for practical purposes will be obtainable that the thermostatic controller will act in the desired manner.

Both in Fig. 1 and 2 in the drawing, 32 is an adjustable set screw adapted to determine how far the heater plate may be depressed when mounting the same.

A plurality of modifications may naturally be suggested within the scope of invention, and the invention shall not be considered limited to the embodiments described above for the sake of explanation. In connection with heater plates comprising a central portion and one or more annular portions surrounding the former, all of which portions are provided with resistance elements, the thermostatic controller is preferably adapted to control the admission of electric energy to the resistance element of said central portion only, whereas the resistance elements of the outer annular portions may be adapted to be cut in or out by means of separate switches.

What I claim and desire to secure by Letters Patent is:

In an electrically heated stove, a support, a plug receptacle carried by said support, a heater plate mounted in a position above said support and plug receptacle, plug means carried by the underside of the heater plate and extending into said receptacle, a resistance heating element in said plate connected to said plug means, said plate having a socket formed in its underside and provided with a top heat conducting wall adjacent the heating element, an adjustable thermostatic control member mounted in said support for limited movement toward and away from the plate and in register with the socket when the plug means of the plate is in the receptacle, said thermostatic control member having an upper heat conducting surface, spring means urging the thermostatic control member up in the socket to press the upper heat conducting surface into heat conducting engagement with the top heat conducting wall of the socket, and a heating circuit controlled by said thermostatic control member for automatically breaking and closing said circuit at temperatures determined by the adjustment of said adjustable thermostatic control member.

BROR HUGO RAGNVALD SANDELL.